United States Patent
Kogiantis et al.

(10) Patent No.: US 7,554,952 B2
(45) Date of Patent: Jun. 30, 2009

(54) DISTRIBUTED MULTIPLE ANTENNA SCHEDULING FOR WIRELESS PACKET DATA COMMUNICATION SYSTEM USING OFDM

(75) Inventors: Achilles G. Kogiantis, Madison, NJ (US); Jung Ah Lee, Pittstown, NJ (US); Lawrence H. Ozarow, Morris Township, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 505 days.

(21) Appl. No.: 11/054,256

(22) Filed: Feb. 9, 2005

(65) Prior Publication Data

US 2006/0203792 A1    Sep. 14, 2006

(51) Int. Cl.
*H04Q 7/00* (2006.01)
(52) U.S. Cl. .................. 370/334; 370/337; 370/350; 455/452.2; 455/439
(58) Field of Classification Search ......... 370/334–337, 370/342–345, 267, 347, 328, 329, 331, 350; 455/450, 452.1, 452.2, 436, 439, 561, 562.1
See application file for complete search history.

(56) References Cited

U.S. PATENT DOCUMENTS

| | | | |
|---|---|---|---|
| 6,700,882 B1 * | 3/2004 | Lindoff et al. | 370/337 |
| 2003/0128658 A1 * | 7/2003 | Walton et al. | 370/208 |
| 2004/0248618 A1 * | 12/2004 | Yoshii et al. | 455/562.1 |
| 2005/0058097 A1 * | 3/2005 | Kang et al. | 370/329 |
| 2005/0265470 A1 * | 12/2005 | Kishigami et al. | 375/267 |
| 2006/0002287 A1 * | 1/2006 | Kuwahara et al. | 370/208 |
| 2006/0116078 A1 * | 6/2006 | Miyoshi | 455/45 |

OTHER PUBLICATIONS

"A Simple Transmit Diversity Technique for Wireless Communications," by Siavash M. Alamouti; IEEE Journal on Select Areas in Communications, vol. 16, No. 8, Oct. 1998.
"Downlink Best-Effort Packet Data with Multiple Antennas," by Achilles Kogiantis and Lawrence Ozarow; 0-7803-7802-4/03/$17.00@2003 IEEE, pp. 715-719.
"On Transmit Diversity and Scheduling in Wireless Packet Data," by Achilles G. Kogiantis, Niranjan Joshi, Oguz Sunay; 0-7803-7097-1/01/$10.00@2001 IEEE, pp. 2433-2437.
"Gaussian Multiaccess Channels with ISI: Capacity Region and Multiuser Water-Filling," by Roger S. Cheng; IEEE Transactions on Information Theory, vol. 39, No. 3, May 1993.
IEEE Standards 802.16, IEEE Standard for Local and metropolitan area networks, Part 16: Air Interface for Fixed Broadband Wireless Access Systems, Oct. 1, 2004, pp. 307-632.
European Search Report for Application No. EP 06 25 0535 dated May 4, 2006.

(Continued)

*Primary Examiner*—Nhan T Le

(57) ABSTRACT

A wireless communication system (20) includes using multiple antennas (30, 32) for simultaneous transmissions to multiple mobile stations (24, 26). A distributed multiple antenna scheduling (DMAS) technique includes selecting a plurality of mobile stations for at least receiving simultaneous transmissions on at least one selected subcarrier from within a carrier bandwidth having orthogonal frequency division multiplexing (OFDM). In a disclosed example, a plurality of mobile stations are selected for each subcarrier within the carrier bandwidth. A disclosed example includes grouping subcarriers together into subsets to reduce computation complexity for determining which mobile stations to select for the simultaneous transmission.

22 Claims, 1 Drawing Sheet

OTHER PUBLICATIONS

Gorokhov, et al., "Transmit/Receive MIMO Antenna Subset Selection" Acoustics, Speech and Signal Processing, 2004. Proceedings. (ICASSP '04).
IEEE International Conference in Montreal, Quebec, Canada May 17-21, 2004, Piscataway, NJ, USA, IEEE, May 17, 2004, pp. 13-16, XP010717825, ISBN: 0-7803-8484-9.
Barriac, G., et al., "Antenna Selection for Space-Time Communication With Covariance Feedback." Global Telecommunications Conference, 2004.

Globecom '04. IEEE Dallas, TX, USA, Nov. 29-Dec. 3, 2004, Piscataway, NJ, USA, IEEE, Nov. 29, 2004, pp. 1234-1238, XPO10757713. ISBN: 0-7803-8794-5.

Molisch, A., et al., "MIMO Systems With Antena Selection." IEEE Microwave Magazine, IEEEService Center, Piscataway, NJ, USA, vol. 5, No. 1, Mar. 2004, pp. 46-56, XP002342899, ISSN: 1527-3342.

* cited by examiner

DISTRIBUTED MULTIPLE ANTENNA SCHEDULING FOR WIRELESS PACKET DATA COMMUNICATION SYSTEM USING OFDM

FIELD OF THE INVENTION

This invention generally relates to telecommunications. More particularly, this invention relates to wireless communication systems.

DESCRIPTION OF THE RELATED ART

Wireless communication systems are well known and in widespread use. Wireless communication networks are being increasingly used in changing ways. There is a continued need to increase the overall capacity of a wireless communication network. The overall capacity of a network relates to the number of subscribers that can be served and the amount of information that each subscriber can convey at any particular time. Wireless communication service providers are constantly striving to provide increased capacity.

Traditionally, increased capacity was achieved by providing more communication channels and attempting to increase the amount of information on each channel at any given time. One way of increasing the information throughput is by increasing the power of transmitted signals. Another is expanding the bandwidth over which communication is established. One difficulty with these approaches is that power and bandwidth are typically limited by governmental and standards organizations. Additionally, the amount of power used in a transmission is limited for wireless devices by the battery or other power source for a mobile station.

With the increased use of wireless communication networks and increased capabilities desired by consumers, other approaches for increasing network capacity have been proposed. One approach includes increasing the number of antennas used to transmit and receive communication signals. In one example, the antennas are arranged as an array of antennas and a multiple input multiple output technique is used for communicating multiple distinct signals. One example system is the Bell Labs layered space time (BLAST) system. With such arrangements, all antennas in the array are used to communicate information between the antennas and a mobile station at a particular instant of time.

Although a multiple input multiple output configuration is helpful in increasing the information throughput of a particular communication channel, it does not necessarily help address the need to increase the number of subscribers that can adequately use the communication network. For example, the entire antenna array is used by only one subscriber at any one particular time, which does not increase the number of subscribers that can use the system at that time. Additionally, some of the antennas in the array may not be the most appropriate for conveying information to certain subscribers at certain times. As known, channel conditions vary over time and a variety of conditions adversely impact communications between a mobile station and a base station. Therefore, even though a plurality of antennas is intended to convey information, some of the antennas may not be conveying information successfully, which essentially reduces the efficiency of the antenna array. One measure of such efficiency is the ratio of the amount of information that is actually conveyed to the amount of information that the antenna array is designed to convey.

Another proposal has been to use a transmit diversity scheme that relies on the principle of creating multiple independent paths to a mobile station. It is recognized that such paths will fade independently. Space-time coding (STC) presents a mobile station with a signal that has the average channel whereas selection transmit diversity (STD) chooses the better of the multiple transmit antennas. It has been noted in the literature that STC schemes have limited advantage over single antenna transmission for scheduled packet data transmission. STD schemes have been shown to perform better than STC.

When transmitting data along a downlink to a mobile station, full power is often used. Therefore, with an appropriate scheduling algorithm, high signal to interference noise ratio values can be obtained at the mobile station. Adaptive modulation exploits this occurrence by using higher modulation for users with a good signal to interference noise ratio. The constellation, however, is often limited for practical reasons. Additionally, it is difficult to support modulation sizes larger than 64 for a time-varying wireless channel. In some instances it is difficult to support modulation sizes larger than 16. Accordingly, there are limitations on the spectral efficiency obtainable in known systems. For example, although QAM with unrestricted constellation size can achieve spectral efficiency within approximately 5 dB of AWGN capacity, spectral efficiency is limited by the constellation shape and size in real systems.

It has been proposed to schedule multiple users using multiple antenna technology using distributed multi-antenna scheduling (DMAS). That concept (DMAS) was originally developed for CDMA packet data systems to exploit multi-user diversity by scheduling multiple users jointly to achieve maximum throughput for each user pair.

Those skilled in the art are always striving to make improvements. For example, there are other configuration schemes that may benefit from using one or more multiple antenna transmitting techniques. One area that has not been developed, which is addressed in the description of an example implementation of this invention given below, is the orthogonal frequency division multiplexing (OFDM) type of communication system. This invention exploits frequency selectivity in such systems and employs multi-user diversity to improve system throughput performance.

SUMMARY OF THE INVENTION

An exemplary disclosed method of communicating includes selecting a plurality of mobile stations for at least receiving a simultaneous transmission from a corresponding plurality of antennas on at least a selected one of a plurality of subcarriers from within a given carrier bandwidth.

In one example, two transmit antennas are used for transmitting on the same subcarrier or a group of subcarriers to each of two mobile stations.

In one example, the mobile stations are selected by determining a power level associated with transmitting to each of at least two mobile stations. The mobile stations are then selected such that they have the maximum combined transmission data rate when using the selected subcarrier.

In one example, pluralities of the subcarriers from within the carrier bandwidth are grouped into subsets and the determinations made for selecting mobile stations for at least one of the subcarriers in the subset is used for controlling use of the other subcarriers within the subset. This example takes advantage of the nature of subcarriers, including the recognition that channel conditions remain essentially the same over a small part of the given bandwidth. This simplifies the determinations for selecting a plurality of mobile stations for each of a relatively large plurality of subcarriers within a given carrier bandwidth.

The various features and advantages of this invention will become apparent to those skilled in the art from the following detailed description. The drawings that accompany the detailed description can be briefly described as follows.

DETAILED DESCRIPTION

Figure 1:
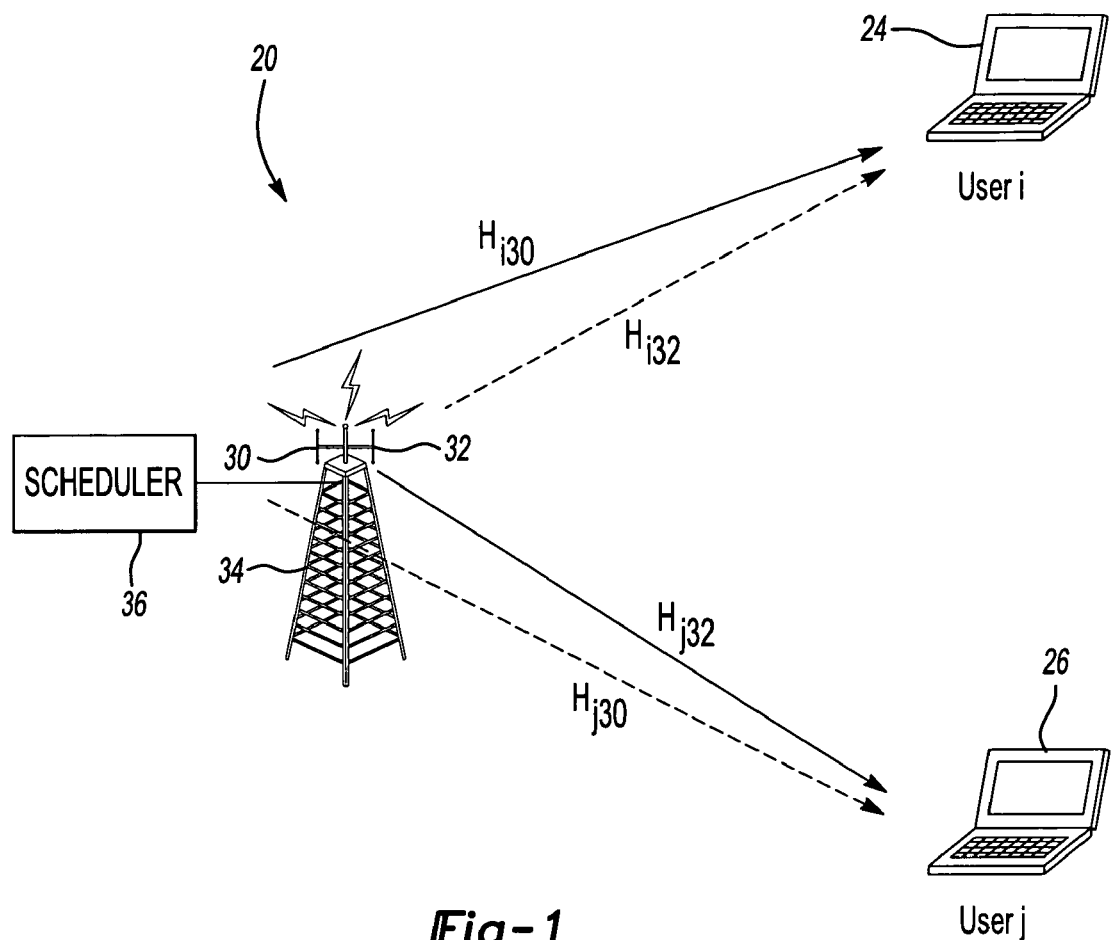
FIG. 1 schematically illustrates selected portions of a wireless communication network utilizing a multiple antenna transmission technique designed according to an embodiment of this invention.

FIG. 1 schematically shows selected portions of a communication network 20. A plurality of mobile stations 24 and 26 use wireless communication for transmitting and receiving signals. The mobile stations 24 and 26 may be any one of a plurality of known devices capable of wireless voice, data, video or combined communications. For purposes of discussion, the mobile station 24 will be sometimes referred to as user i and the mobile station 26 will sometimes be referred to as user j.

As schematically shown in FIG. 1, each of the mobile stations receives a communication transmitted from each of a plurality of antennas 30 and 32 of a base station 34. A scheduler 36 schedules transmissions from the antennas 30 and 32 such that a simultaneous transmission from each antenna is provided to each of the mobile stations. Although two antennas and two mobile stations are shown in FIG. 1, this invention is not limited to two-antenna or two-user arrangements.

As schematically shown in FIG. 1, the frequency-domain channel co-efficents (CSI) are shown as $H_{im}(k)$ and $H_{jm}(k)$ for the users i and j, respectively, for antenna m. The index k can be used to denote the subcarrier or a group of subcarriers from within a given carrier bandwidth used for the transmission.

The terms "subcarrier" and "tone" as used in this description are intended to refer to the distinct subcarriers or tones from within a carrier bandwidth in an orthogonal frequency division multiplexing (OFDM) communication system. The manner in which a carrier bandwidth is divided into such subcarriers or tones is known. The disclosed example takes advantage of this arrangement of a carrier bandwidth and it provides an improved capacity of a wireless communication system by implementing a multiple antenna transmission technique on a per subcarrier or a group of subcarriers basis. Let the notation $Y_i(k)$ and $Y_j(k)$ at the mobile stations 24 and 26, respectively, indicate the received signals at each of the mobile stations. The received signals can be described as:

$$Y_i(k) = P_i(k)H_{i1}(k) + P_j(k)H_{i2}(k) + Z_i(k) \quad (1)$$

$$Y_j(k) = P_i(k)H_{j1}(k) + P_j(k)H_{j2}(k) + Z_j(k) \quad (1)$$

$P_i(k)$ and $P_j(k)$ denote transmit powers and $Z_i(k)$ and $Z_j(k)$ denote additive noise for users i and j for subcarrier k.

For each subcarrier k within the carrier bandwidth, a set of mobile stations (i, j) is selected for receiving a simultaneous transmission from each of the plurality of antennas 30 and 32. Selecting the mobile stations for such transmissions in one example includes determining the powers $P_i(k)$ and $P_j(k)$ that maximize the sum rate of the two mobile stations (i.e., user i and user j). This can be expressed as:

$$\max_{i,j,P_i(k),P_j(k)} \left[ \log_2\left(1 + \frac{P_i(k)|H_{i1}(k)|^2}{P_j(k)|H_{i2}(k)|^2 + |Z_i(k)|^2}\right) + \log_2\left(1 + \frac{P_j(k)|H_{j2}(k)|^2}{P_i(k)|H_{j1}(k)|^2 + |Z_j(k)|^2}\right) \right] \quad (2)$$

The transmit power is subject to the total power $P_{total}$ available, which can be described as:

$$\sum_k [P_i(k) + P_j(k)] = P_{Total} \quad (3)$$

In one example, the determination regarding which mobile stations to transmit to from each antenna is made for each subcarrier. By applying such a transmission technique to each subcarrier, the overall throughput and capacity of the system using the given carrier bandwidth is increased compared to previous OFDM transmission schemes. One advantage to using such an antenna scheduling technique on a per subcarrier basis is that it exploits the characteristics of the individual subcarriers, which vary across the spectrum of subcarriers within the carrier bandwidth. For example, subcarriers at one end of the spectrum typically will have very different channel conditions compared to subcarriers at an opposite end of the carrier bandwidth. Utilizing the unique channel conditions of each subcarrier for selecting the best possible plurality of mobile stations for receiving a simultaneous transmission on that subcarrier provides a substantial improvement in network capacity where OFDM is employed.

In one example, a plurality of mobile stations are selected for at least receiving a simultaneous transmission on each of the subcarriers. Where the number of subcarriers is large, the task of selecting mobile stations can become complicated in such a manner that the complexity introduces a computation cost that may outweigh the benefits of increased network capacity. One example embodiment addresses this by simplifying the determination of which mobile stations to select by assuming equal power allocation to each of the selected mobile stations. Accordingly, $P_i(k) = P_j(k) = P(k)/2$. The optimization determination then becomes:

$$\max_{i,P(k)} \left[ \log_2\left(1 + \frac{P(k)|H_{i1}(k)|^2}{P(k)|H_{i2}(k)|^2 + 2|Z_i(k)|^2}\right) \right] + \max_{j,P(k)} \left[ \log_2\left(1 + \frac{P(k)|H_{j2}(k)|^2}{P(k)|H_{j1}(k)|^2 + 2|Z_j(k)|^2}\right) \right] i \neq j \quad (4)$$

Accordingly, a joint optimization determination becomes two one-dimensional optimization problems. When equal power allocation to all of the illustrated mobile stations is utilized, the following is true:

$$P(k) = P_{Total}/2K \quad (5)$$

It follows that the optimization criteria can be obtained from:

$$\max_i \left[ \log_2\left(1 + \frac{P_{Total}|H_{i1}(k)|^2}{P_{Total}|H_{i2}(k)|^2 + 2K|Z_i(k)|^2}\right) \right] + \max_j \left[ \log_2\left(1 + \frac{P_{Total}|H_{j2}(k)|^2}{P_{Total}|H_{j1}(k)|^2 + 2K|Z_j(k)|^2}\right) \right] i \neq j \quad (6)$$

In one example, a known search algorithm is used for selecting the plurality of mobile stations that maximizes the selection metric from all of the potential users within a cell served by the base station 34.

One example further simplifies the computational complexity for determining the best mobile stations to be served on each subcarrier by grouping subcarriers together into subsets. Where subcarriers are grouped together within coherence bandwidths, evaluating the selection metric can be done for one subcarrier within each subset. Fading across a subset is assumed to be flat in one example.

The above example is well suited for OFDMA systems where multiple users share a single bandwidth. It is also possible to use the inventive technique in OFDM systems where an entire carrier bandwidth is dedicated to a single user. In such an instance, the selection of mobile stations includes determining the powers for maximizing the sum right of at least two users over the entire bandwidth, which can be expressed as:

$$\max_{i,j,P_i(1:K),P_j(1:K)} \sum_k \left[ \log_2\left(1 + \frac{P_i(k)|H_{i1}(k)|^2}{P_j(k)|H_{i2}(k)|^2 + |Z_i(k)|^2}\right) + \log_2\left(1 + \frac{P_j(k)|H_{j2}(k)|^2}{P_i(k)|H_{j1}(k)|^2 + |Z_j(k)|^2}\right) \right] \quad (7)$$

Assuming equal power for between two antennas, the following is true:

$$P_i(k) = P_j(k) \triangleq P(k)/2 \quad (8)$$

The metric criteria determination can be expressed as:

$$\max_{i,j,P_i,P_j} \sum_k \left[ \log_2\left(1 + \frac{P(k)|H_{i1}(k)|^2}{P(k)|H_{i2}(k)|^2 + 2|Z_i(k)|^2}\right) + \log_2\left(1 + \frac{P(k)|H_{j2}(k)|^2}{P(k)|H_{j1}(k)|^2 + 2|Z_j(k)|^2}\right) \right] \quad (9)$$

Figure 2:
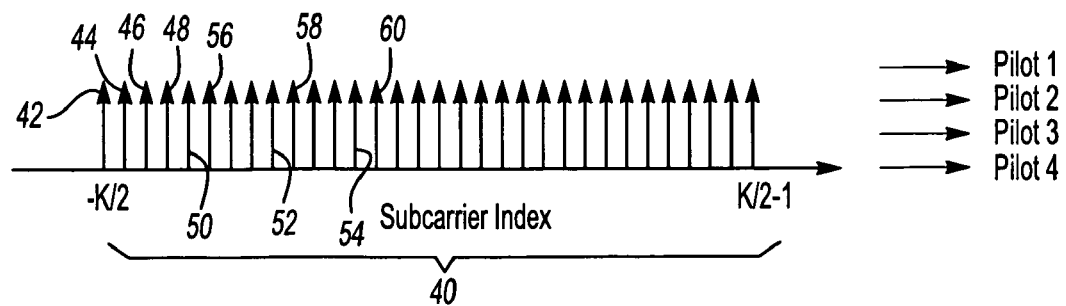
FIG. 2 schematically illustrates example pilot structure required to support necessary measurements by mobile stations in one example implementation of this invention.

FIG. 2 schematically shows a pilot structure comprising a plurality of subcarriers or tones from within a given carrier bandwidth 40.

In one example, a coherence bandwidth used for grouping subcarriers into a subset includes a plurality of adjacent subcarriers such as the subcarriers 42, 44, 46 and 48. The next subset would begin with subcarrier 50 in such an example.

Another example technique for grouping subcarriers together into subsets includes using a pilot structure based on a number of transmit antennas. In FIG. 2, four pilots and four transmit antennas are used. In this instance, selecting every fourth subcarrier to be placed into a subset associates each subset with one of the pilots, which are orthogonal to each other. For example, the subcarriers 42, 50, 52 and 54 are within a first subset. The subcarriers 44, 56, 58 and 60 are within the next subset. Selecting every fourth subcarriers (i.e., because there are four transmit antennas), provides another technique for grouping subcarriers into subsets for ultimately simplifying the number of determinations made for selecting mobile stations for each subcarrier.

Using a pilot structure is useful as part of the mobile station selection process because pilots can be used to provide channel feedback in a known manner. For example, pilots are transmitted at the base station 34 periodically and an antenna system with M transmit antennas typically transmits M orthogonal pilots from each antenna. Another example uses time-multiplexed pilot structures when the Doppler frequency is not high. At each mobile station, the pilot strength is measured at each mobile station (i,j) and fed back to the base station 34.

Referring again to FIG. 2, the pilot signal to interference ratio (SIR) for user i, antenna m and subcarrier k can be expressed as:

$$SIR_{im}^{Pilot}(k) = \frac{P^{Pilot}|H_{im}(k)|^2}{|Z_i(k)|^2} \quad (10)$$

where $P^{Pilot}$ denotes pilot transmit power, $H_{im}(k)$ is the channel coefficient for tone k, and $|Z_i(k)|^2$ denotes interference power and includes inter-carrier interference (ICI) and the thermal noise.

The signal to interference ratio for every subcarrier is fed back to the base station 34 so that the scheduler 36 can select the appropriate mobile stations and schedule the antennas accordingly. When a channel is flat within a subset of subcarriers, the metric in equation (2) above can be determined from the pilot signal to interference ratio based on the relation:

$$\log_2\left(1 + \frac{P_i(k)|H_{i1}(k)|^2}{P_j(k)|H_{i2}(k)|^2 + |Z_i(k)|^2}\right) = \log_2\frac{(P_i(k)|H_{i1}(k)|^2/|Z_i(k)|^2)}{P_h(k)|H_{i2}(k)|^2/|Z_i(k)|^2 + 1} \quad (11)$$

$$= \log_2\left(1 + \frac{P_i(k)SIR_{i1}^{Pilot}(k)/P^{Pilot}}{P_j(k)SIR_{i2}^{Pilot}(k)/P^{Pilot} + 1}\right)$$

When equal power allocation is used, antenna selection can be done at the mobile station. The signal to interference ratios for all antennas are measured and the antenna selection metric is computed at the mobile station. When $P_i(k) = P_j(k)$, the metric $M_{im}$ for user i and antenna m is computed as:

$$M_{im} = \log_2\left(1 + \frac{P_i(k)|H_{i1}(k)|^2}{P_j(k)|H_{i2}(k)|^2 + |Z_i(k)|^2}\right) = \log_2\left(1 + \frac{SIR_{i1}^{Pilot}(k)}{SIR_{i2}^{Pilot}(k) + 1}\right) \quad (12)$$

and the CQI of user i for tone k is computed as $$CQI_i(k) = \max_m M_{im}(k)$$

The maximum metric or the CQI in this instance is the best measured metric and, therefore, provides an indication of which mobile stations to select to be associated with each antenna for a subcarrier or a group of subcarriers.

In one example mode of operation the power allocation is equal and the scheduler 36 selects users for mobile stations that maximizes equations (2) or (7). In this instance:

$$CQI_i(k) = MAX_m[M_{im}(k)]$$

$$a_i(k) = \text{argmax}_m[SIR_{im}(k)]$$

In another example mode of operation, the power allocation is flexible and the scheduler 36 selects mobile stations that maximizes equations (6) or (9) above where $CQI_{im}(k) = SIR_{im}(k)$.

There are other metrics and techniques for deciding which mobile stations to select for each antenna for a subcarrier and those skilled in the art who have the benefit of this description will realize what works best for their particular situation. For example, the IEEE 802.16-REVd and IEEE 802.16-REVe systems have preambles and messages to support beam forming technology. The same preambles can be used as criteria for distributed multiple antenna scheduling in accordance with the description provided above. Utilizing an embodiment of the invention with an IEEE 802.16-REVe type system will significantly increase the sector throughput in the forward link for a variety of mobile environments.

In one example, the adaptive antenna subsystem (AAS) preamble is transmitted periodically from a base station. The mobile station selects the preamble and performs antenna selection as known. Additionally, the CQI of the selected antenna is fed back to the base station. Antenna selection and scheduling decisions can then be made at the base station. The base station could use flexible or optimal power allocation algorithms to improve throughput performance.

In IEEE 802.16-REVd, a portion of the frame is dedicated to traffic that supports AAS operation. During this portion, the AAS preambles are transmitted in the downlink for beam selection and downlink channel estimation. Although the AAS preamble is intended for beam forming, the same preamble is used in this example for distributed multiple antenna scheduling (DMAS). In this example, the preambles are transmitted from each antenna, whereas in the AAS mode the preambles are transmitted from each beam. A time-domain structure of the preamble used for DMAS has two identical OFDM symbols. The preamble is transmitted from up to M antennas. The example is shown for M=4 antennas, but the invention is not limited to M=4 and can be generalized. The preamble sequence for antenna m, subcarrier k, is given by the following:

For m=0, $$P_{AAS}^m(k) = \begin{cases} 0 & k \bmod 4 \neq 0 \\ conj\{P(k)\} & k \bmod 4 = 0 \end{cases}$$

and for m=1,2,3, $$P_{AAS}^m(k) = \begin{cases} 0 & k \bmod 4 \neq m \\ conj\{P(k+2-m)\} & 4 \bmod 4 = m \end{cases}$$

where P(k) denotes the full-bandwidth preamble sequence for tone k.

The mobile stations detect the preambles transmitted from each antenna. A mobile station selects the best antenna for downlink transmission and informs the base station 34 about the preferred antenna. A known type of message can be used to indicate the selected antenna index. In one example, two messages are used to feedback the CQI for a specific antenna. An appropriate message with a specific antenna mask can be used to request CQI for a specific antenna. The mobile station responds by sending a message with channel measurements for a set of frequencies corresponding to each antenna.

Given this description and knowledge of the IEEE 802.16-REVd and IEEE 802.16-REVe standards, those skilled in the art will be able to develop an appropriate transmitter and receiver configuration to achieve distributed multiple antenna scheduling that uses the preamble as a means for selecting mobile stations for a subcarrier, for example, as just described.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising:
   dividing a carrier bandwidth into a plurality of subcarriers;
   selecting a plurality of mobile stations for at least receiving a simultaneous transmission from a corresponding plurality of antennas on at least a selected one of the plurality of subcarriers from within the given carrier bandwidth such that more than one mobile station is selected for at least receiving the simultaneous transmission on the selected at least one subcarrier;
   arranging the plurality of the subcarriers into a plurality of subsets, with each subset having at least two of the subcarriers; and
   determining which mobile stations to select for each of the subcarriers within at least one of the subsets based upon at least one selected criteria associated with at least one of the subcarriers from within the subset.

2. The method of claim 1, comprising using a first one of the plurality of antennas for transmitting a first communication to the selected mobile stations and using a second one of the plurality of antennas for transmitting a second communication to the selected mobile stations.

3. The method of claim 2, comprising using distributed multiple antenna scheduling for controlling the transmissions from the plurality of antennas such that a first one of the mobile stations effectively receives the first communication and a second one of the mobile stations effectively receives the second communication.

4. The method of claim 1, comprising
   determining a power level associated with transmitting to each of at least two mobile stations on at least the selected subcarrier; and
   selecting the mobile stations that have a maximum combined transmission data rate for receiving the transmission.

5. The method of claim 1, comprising selecting a plurality of mobile stations for each of the plurality of subcarriers.

6. The method of claim 1, wherein there are M antennas for transmitting the simultaneous transmission and comprising arranging the subsets by taking every Mth subcarrier from within the bandwidth for each of the subsets.

7. The method of claim 6, comprising using a plurality of pilots for selecting the mobile stations, wherein the pilots are orthogonal to each other.

8. The method of claim 1, comprising arranging a plurality of adjacent subcarriers into each subset.

9. The method of claim 1, wherein the carrier bandwidth is arranged into the plurality of subcarriers according to orthogonal frequency division multiplexing.

10. The method of claim 1, comprising selecting more than one of the plurality of subcarriers for the simultaneous transmission.

11. The method of claim 1, wherein each of the mobile stations uses the entire bandwidth.

12. The method of claim 11, comprising selecting the mobile stations for maximizing a sum rate for receiving the transmission during a selected time interval across the entire bandwidth.

13. The method of claim 1, comprising
   using two transmit antennas for simultaneously transmitting on a single subcarrier to each of two mobile stations.

14. The method of claim 1, comprising
using two transmit antennas for simultaneously transmitting on a single group of subcarriers to each of two mobile stations.

15. A method of communicating, comprising:
selecting a plurality of mobile stations for at least receiving a simultaneous transmission from a corresponding plurality of antennas on at least a selected one of a plurality of subcarriers from within a given carrier bandwidth such that more than one mobile station is selected for at least receiving the simultaneous transmission on the selected at least one subcarrier,
determining a power level associated with transmitting to each of at least two mobile stations on at least the selected subcarrier; and
selecting the mobile stations that have a maximum combined transmission data rate for receiving the transmission.

16. The method of claim 15, comprising using a first one of the plurality of antennas for transmitting a first communication to the selected mobile stations and using a second one of the plurality of antennas for transmitting a second communication to the selected mobile stations.

17. The method of claim 16, comprising using distributed multiple antenna scheduling for controlling the transmissions from the plurality of antennas such that a first one of the mobile stations effectively receives the first communication and a second one of the mobile stations effectively receives the second communication.

18. The method of claim 15, comprising selecting more than one of the plurality of subcarriers for the simultaneous transmission.

19. The method of claim 15, wherein each of the mobile stations uses the entire bandwidth.

20. The method of claim 15, comprising
using two transmit antennas for simultaneously transmitting on a single subcarrier to each of the two mobile stations.

21. The method of claim 15, comprising
using two transmit antennas for simultaneously transmitting on a single group of subcarriers to each of the two mobile stations.

22. A method of communicating, comprising:
selecting a plurality of mobile stations for at least receiving a simultaneous transmission from a corresponding plurality of antennas on at least a selected one of a plurality of subcarriers from within a given carrier bandwidth such that more than one mobile station is selected for at least receiving the simultaneous transmission on the selected at least one subcarrier;
arranging the plurality of subcarriers into a plurality of subsets, with each subset having at least two of the subcarriers; and
determining which mobile stations to select for each of the subcarriers within at least one of the subsets based upon at least one selected criteria associated with at least one of the subcarriers from within the subset.

* * * * *